…

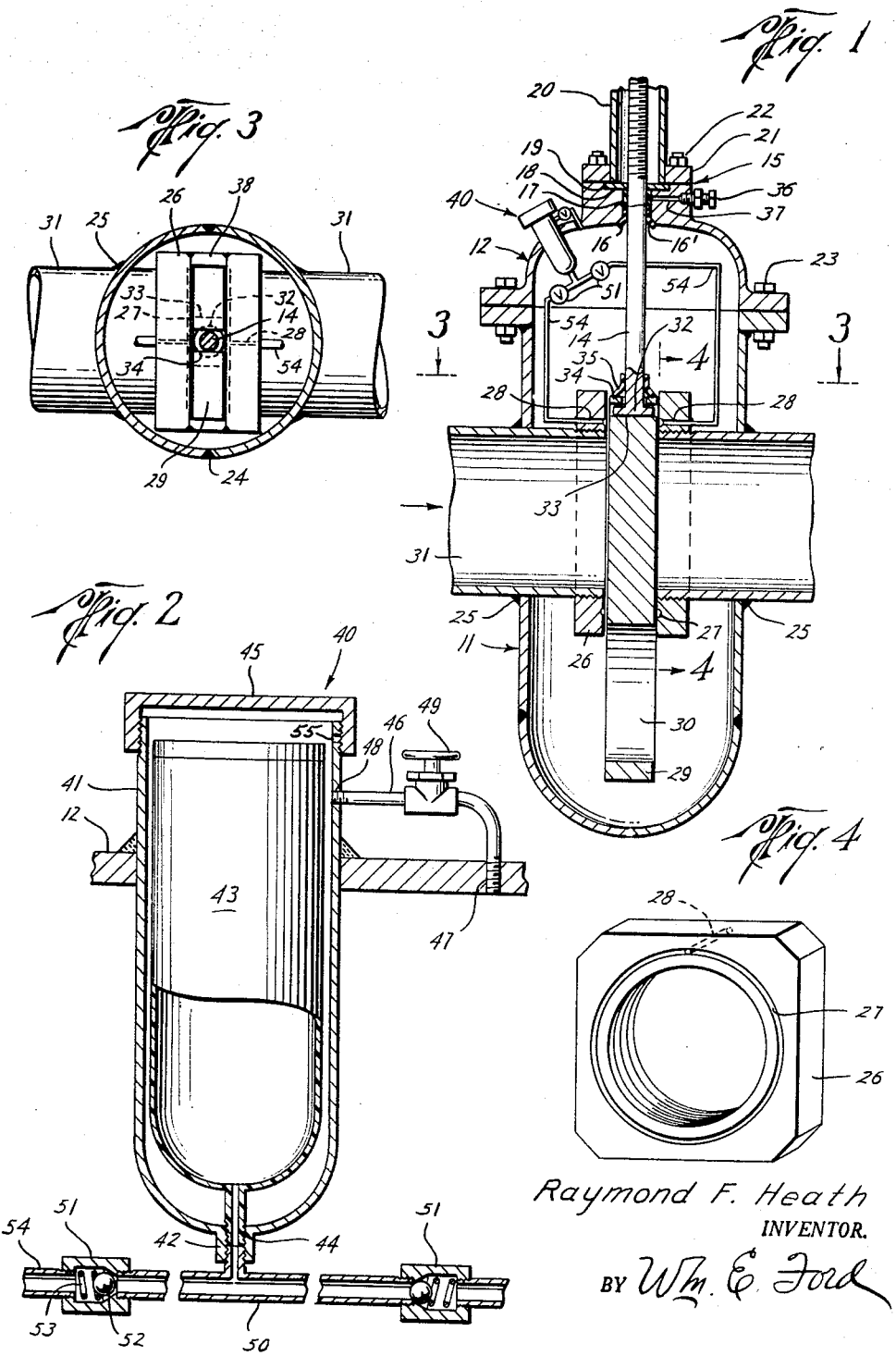

United States Patent Office 2,956,580
Patented Oct. 18, 1960

2,956,580
SELF SEALING GATE VALVE
Raymond F. Heath, 1213 Capitol, Houston, Tex.
Filed Sept. 13, 1955, Ser. No. 533,982
1 Claim. (Cl. 137—246.12)

This invention relates to a self-sealing gate valve with a unitary source of sealant accessible for replacement from the exterior of the valve body, the sealant being subjected to upstream fluid pressure and forced thereby due to the differential between upstream and downstream pressure, to pass to the downstream sealing groove between gate valve element and seat to seal off passage of fluid between upstream and downstream side of the closed valve.

It is therefore a primary object of this invention to provide a self-sealing gate valve with a unitary source of sealant accessible for replacement from the exterior of the valve body, the sealant being subjected to upstream fluid pressure and forced thereby to pass to the downstream sealing groove between gate valve element and seat to seal off fluid passage from upstream to downstream side of the closed valve.

It is a further object of this invention to provide a self-sealing gate valve of this class in which a T from the sealant supply has check valve controlled conduits connected to the sides thereof to extend to annular sealing grooves, between the gate valve element and the seating surfaces in either side thereof, the sealing effect thereby being reversible regardless of which side of the valve may be the upstream or downstream side.

It is an additional object of this invention to provide a self-sealing gate valve of this class in which the distance between seating surfaces is slightly greater than the width of the valve element, the valve element being free to move at least in limited degree in direction of fluid flow, whereby the valve element is forced against the downstream seating surface by upstream pressure and the upstream pressure fluid may thereby pass into the valve body over the clearance between the valve element and the upstream seating surface.

It is a further object of this invention to provide a self-sealing gate valve of this class which may be rigidly constructed, as by a welded plate construction, and which arrives at simplicity of design by providing a minimum of sealing structure parts while still providing for accessibility for replacement of sealant.

Other and further objects will be apparent when the description set forth hereinbelow is considered in connection with the drawings in which:

Fig. 1 is a sectional elevation through a gate valve showing in outline the sealing features of this invention.

Fig. 2 is a sectional elevation through the sealing supply source and its enclosure showing in detail the feature of accessibility of sealant for replacement and the functioning of the sealant supply operation.

Fig. 3 is a sectional plan view taken along line 3—3 of Fig. 1, the seal around the valve stem above the valve element being omitted.

Fig. 4 is a perspective view of a seating plate taken along line 4—4 of Fig. 1.

Referring in detail to the drawings a valve body 11 has mounted thereon a bonnet 12. A valve stem 14 extends through the head 15 of the bonnet and a seal 16 having a flared bottom 16' extends about the stem 14 and is fitted into a receiving counterbore in the under side of the bonnet 12 below a sealant or stuffing box space 17. Above this space an annular groove 18 is provided in the head 15 to receive an annular ring 19 forming the base of a valve stem guard 20 which surrounds the stem 14 externally of the valve 11. A retainer ring 21 extends around the guard 20 and is attached to the bonnet head 15 by suitable cap screws 22, the bonnet in turn being affixed to the valve body by suitable bolts and nuts 23. The ring 21 extends over the outer surface of the guard ring 19 to thus retain the guard in position.

The valve body is of welded construction as best seen in Figs. 1 and 3 and is fabricated in two half sections prior to welding the two sections together as along the weld 24. To this end openings are cut in the sections and pipe 31 inserted through each opening. The outer ends of such pipe are not shown but such may be flanged or threaded as desired for pipe line connections. The inserted pipe is welded at 25 to the valve body section and prior to section assembly a seating surface plate 26 is preferably threaded to the inner ends of the pipe although optionally such connection may be made by welding. Such seating surface plates are preferably of square or rectangular shape with chamfered corners as best seen in Fig. 4.

An annular groove 27 is provided in the inner face of each seat 26 and a passage or bore 28 from the outer side of the plate communicates with such groove 27. A gate valve element 29 which is of slightly less width than the distance between inner surfaces of the plates 26 extends between the plates 26 and has a bore 30 therethrough of preferably the same diameter as the inner diameter of the pipe 31. The stem 14 has a connection head 32 thereon and is inserted sidewardly through a slot 33 in the top of the element 29 while the shank of the stem extends through a slot 34 thereabove of lesser width than the diameter of the head 32. Thus the valve element 29 may move to a limited degree in the direction of fluid flow and away from one seating surface and toward the other seating surface.

A seal 35 extends around a stem 14 above the valve element 29 and when in raised or open position, with the bore 30 in coincidental communication with the pipe bores, the seal 35 bears tightly within the seal 16 in the bonnet 12 thereabove. To insure against leakage the stuffing box or sealing space 17 is filled with a sealing material as plastic through a fitting 36 of conventional design and thus including an outwardly urged check valve, the sealant passing from the fitting through a bore 37 in the bonnet head 15 to the sealing space 17. To insure the desired space between the seating surfaces of the plates 26, spacer blocks 38 are installed between the outer edges of the plates 26, as by welding.

A sealant providing assembly 40 is provided in the bonnet 12, as shown in Fig. 1, or optionally it may be provided in a valve body section. Such an assembly includes a casing or tubular element 41 which may be welded in the bonnet 12 or the valve body 11. The inner end of the casing merges to a small tubular end 42 which is internally threaded. A flexible tubing 43, as a rubber or pliant plastic tube, filled with a sealant, as a paste resembling tooth paste, is inserted through the outer end of the casing 41 and the threaded inner end 44 of such tube is threaded into the internally threaded bore of the casing end 42. The casing is then closed by a cap 45 threaded onto the outer end thereof.

A tubular conduit 46 leads from the interior of the valve at 47 to the interior of the casing 41 at 48 to place the valve interior and casing interior in communication. A valve 49 in the conduit 46 opens and closes it. The casing end 42 has a T 50 threaded thereinto and a check valve 51 is connected to each side of the T 50. The ball seating elements 52 of the check valve 51 are urged by their springs 53 to seat in the direction of the casing. A tubing 54 leads from each check valve to a passage 28 in a plate 26, such tube 54 preferably being welded to the outer side of the plate.

As an optional feature of construction the grooves 27 may be provided in the gate valve surface opposing the grooves as shown in the drawings and in such case the passages 28 will continue through the plates 26 so as to establish fluid communication with the grooves in the gate element.

In operation the gate 29 is forced by the pressure of the upstream fluid to seat upon the downstream plate 26 whereas a clearance space exists between the seating surface of the upstream plate and the gate 29 by virtue of the gate being of less width than the distance spacing the plates 26 apart.

The upstream fluid thus passes through such clearance space into the valve body and, with the valve 49 open, it passes via the tube 46 into the tubular element or housing 41 to bear upon the tube 43 and compress the material therein, such material being preferably a paste or plastic or some suitable effective sealant.

From the tube 43 the sealant is forced by the pressure of the fluid in the housing 41 to pass through the outlet 44 into the tube or tee 50. Upon arriving at the upstream check valve 51 the sealant flow is stopped since the opposite side of the check ball is subject to the same pressure as that acting to unseat the ball, this being so since the upstream fluid has entered the upstream conduit 54 via the upstream groove 27 and passage 28.

On the other hand the sealant will unseat the downstream check ball 52 since the force of the upstream pressure fluid exceeds the downstream fluid pressure which can act thereagainst via the downstream groove 27, passage 28, and conduit 54. The sealant thus may pass through the downstream check valve and via the downstream conduit 54 and passage 28 to the downstream groove 27 to fill such groove and tightly and effectively seal the downstream fluid from the valve body, also sealing off any possibility of the passage of upstream fluid via the downstream seating surfaces to the downstream side of the valve.

The cap 45 is easily removable to permit access to the tube 43 as for replacement, the valve 49 being closed when this is done to cut off valve body pressure fluid therefrom. A relief port 55 is provided to permit the escape of pressure fluid from the housing 41 before the cap 45 is completely unthreaded since otherwise hazard may arise from excess of fluid pressure from within the housing 41 under a range of operating conditions.

Broadly this invention encompasses an easily fabricated and highly serviceable gate valve in which the upstream pressure fluid acts to seal off against leakage between the downstream side of the valve across the downstream seating surface, a single sealant reservoir being provided and such being easily accessible for replacement while being subject to valve body fluid pressure.

The invention thus described is not limited to the features of construction disclosed but other structures are considered as well as such may fall within the broad spirit of the invention and within the broad scope of interpretation claimed and merited for the appended claim.

What is claimed is:

The combination of a lubricating system operative responsive to fluid pressure differential and a gate valve comprising a housing having a fluid inlet thereinto and a fluid outlet therefrom, a valve element of slightly lesser width than the distance between fluid inlet and outlet having opposed seating surfaces and being adapted to open and close off fluid flow between said inlet and said outlet, a valve stem for moving said valve element with relation to said valve body between open and closed positions and being connected to said valve element to permit limited transverse movement of said valve element with relation thereto at least to the extent of the difference in distance between valve inlet and outlet and valve element width whereby said valve element in closed position may be moved by upstream pressure fluid to seat against said outlet while upstream pressure fluid fills the valve body at such upstream fluid pressure, there being annular groove means provided in at least one of said inlet and the valve element seating surface adjacent thereto and in at least one of said outlet and the valve element seating surface adjacent thereto, said lubricating system comprising a casing, means connecting the casing to extend part within and part without said housing, a sealing containing flexible container within said casing, a closure removably connected to the outer end of said casing to permit inspection and removal of said container, a three-way conduit within said housing with the outer end of one leg connected to establish fluid communication with said sealant container, and with a check valve yieldably urged seated inwardly connected to each outer end of the other two legs of said three-way conduit, a fluid conductor with one end connected to said casing externally of said housing to establish fluid communication with the casing interior and with the other end connected to establish fluid communication with the interior of said housing, a valve accessible from the housing exterior to open and close said fluid conductor, a flexible, tubular conduit from the outer end of one check valve to communicate with the upstream of said groove means and a flexible, tubular conduit from the outer end of the other check valve to communicate with the downstream of said groove means, whereby with said valve element urged seated against said outlet by upstream pressure fluid which also acts through said fluid conductor upon said sealant container to force sealant therefrom and which acts through said one conduit to resist unseating of the check valve connected thereto so that said sealant forces open the check valve connected to said other conduit in opposition to downstream fluid pressure and passes through said other conduit to said downstream groove to seal against pressure fluid escape from said housing by way of said outlet.

References Cited in the file of this patent

UNITED STATES PATENTS

| 2,065,628 | Taylor | Dec. 29, 1936 |
| 2,299,517 | Volpin | Oct. 20, 1942 |
| 2,317,657 | Volpin | Apr. 27, 1943 |
| 2,332,282 | Volpin | Oct. 19, 1943 |
| 2,360,599 | Volpin | Oct. 17, 1944 |
| 2,514,532 | Allen | July 11, 1950 |
| 2,530,744 | Volpin | Nov. 21, 1950 |
| 2,591,038 | Allen | Apr. 1, 1952 |
| 2,657,898 | Volpin | Nov. 3, 1953 |
| 2,726,842 | Seamark | Dec. 13, 1955 |
| 2,751,127 | Mitton | June 19, 1956 |

FOREIGN PATENTS

| 187,519 | Great Britain | Oct. 26, 1922 |